(No Model.) 3 Sheets—Sheet 1.

H. M. REICHENBACH.
APPARATUS FOR MANUFACTURING PHOTOGRAPHIC FILMS.

No. 599,631. Patented Feb. 22, 1898.

WITNESSES:
G. S. Dey.
C. G. Crannell.

INVENTOR:
Henry M. Reichenbach,
By Geo. B. Selden, atty.

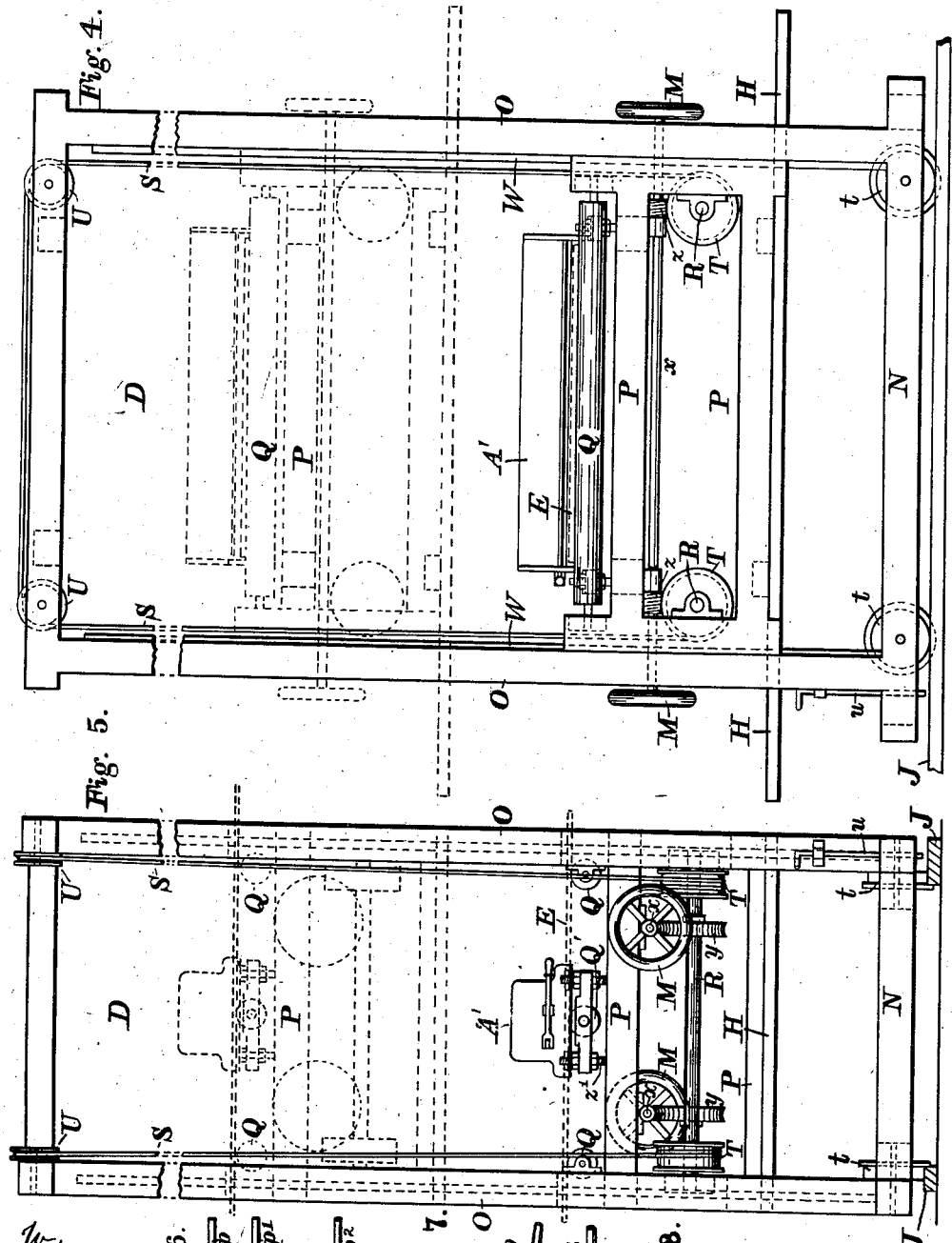

(No Model.) 3 Sheets—Sheet 3.
H. M. REICHENBACH.
APPARATUS FOR MANUFACTURING PHOTOGRAPHIC FILMS.
No. 599,631. Patented Feb. 22, 1898.
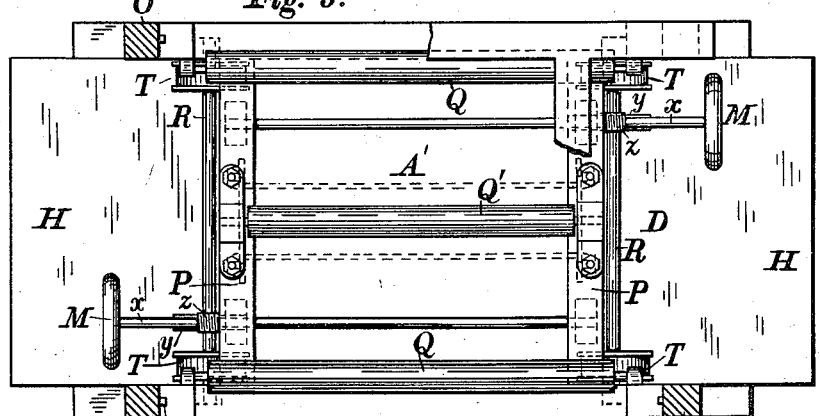
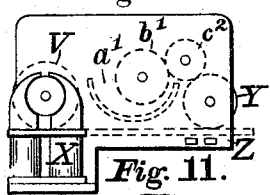
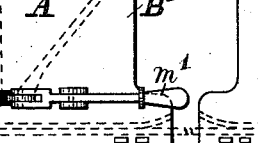
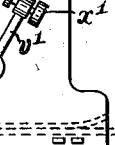
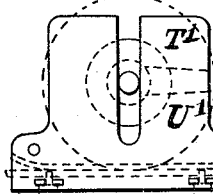
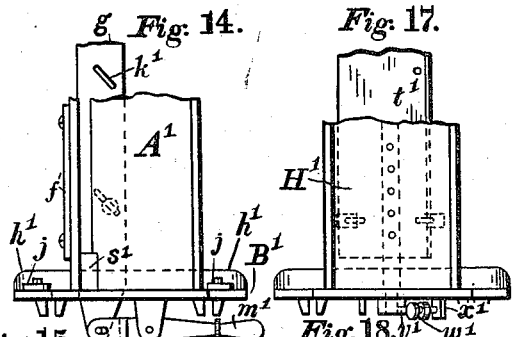
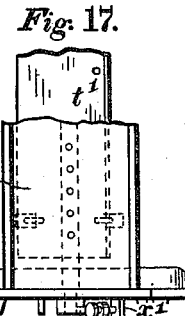
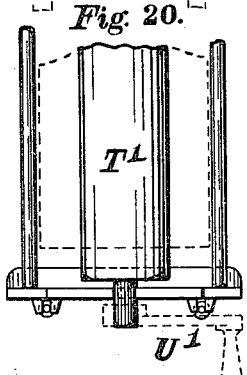
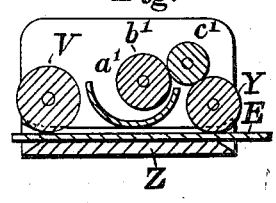
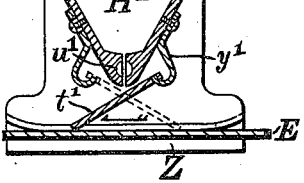
WITNESSES:
G. S. Dey.
C. G. Cramwell
INVENTOR:
Henry M. Reichenbach.
By Geo. B. Selden,
Atty.

UNITED STATES PATENT OFFICE.

HENRY M. REICHENBACH, OF ROCHESTER, NEW YORK, ASSIGNOR TO THE REICHENBACH, MOREY & WILL COMPANY, OF SAME PLACE.

APPARATUS FOR MANUFACTURING PHOTOGRAPHIC FILMS.

SPECIFICATION forming part of Letters Patent No. 599,631, dated February 22, 1898.

Application filed April 1, 1897. Serial No. 630,223. (No model.)

*To all whom it may concern:*

Be it known that I, HENRY M. REICHENBACH, a citizen of the United States, residing at Rochester, New York, have invented an Improved Apparatus for Manufacturing Photographic Films, of which the following is a specification, reference being had to the accompanying drawings.

My invention relates to an improved apparatus for manufacturing photographic films, which improvement is fully described and illustrated in the following specification and the accompanying drawings, the novel features thereof being specified in the claims annexed to the said specification.

Figure 1:
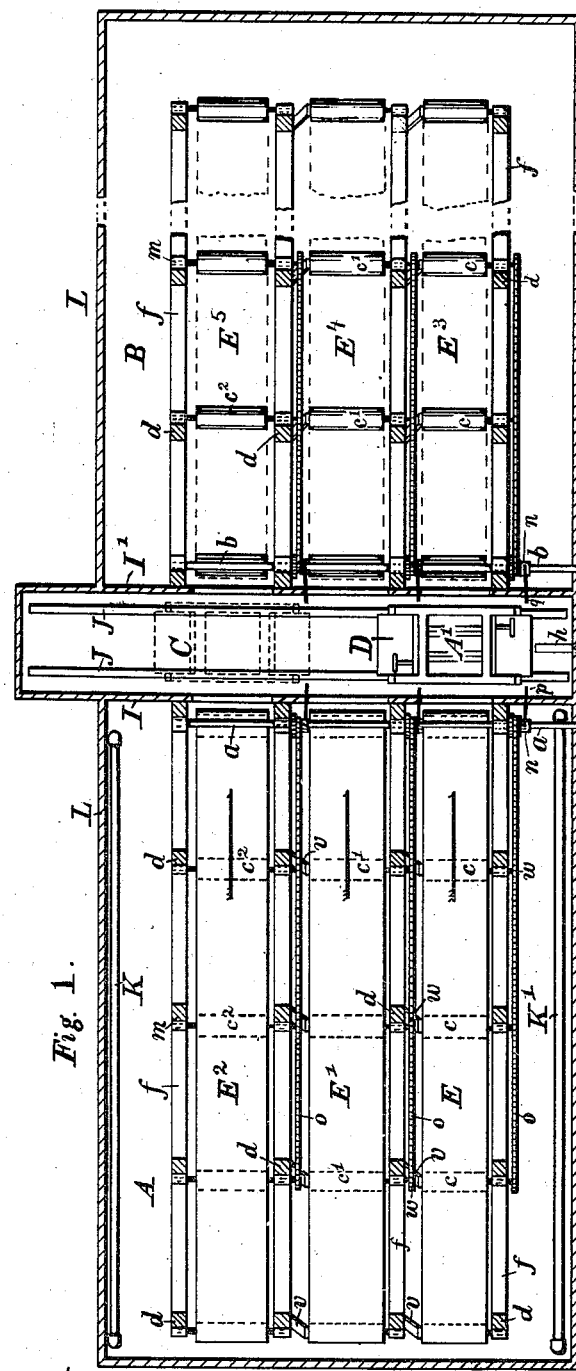
Figure 2:
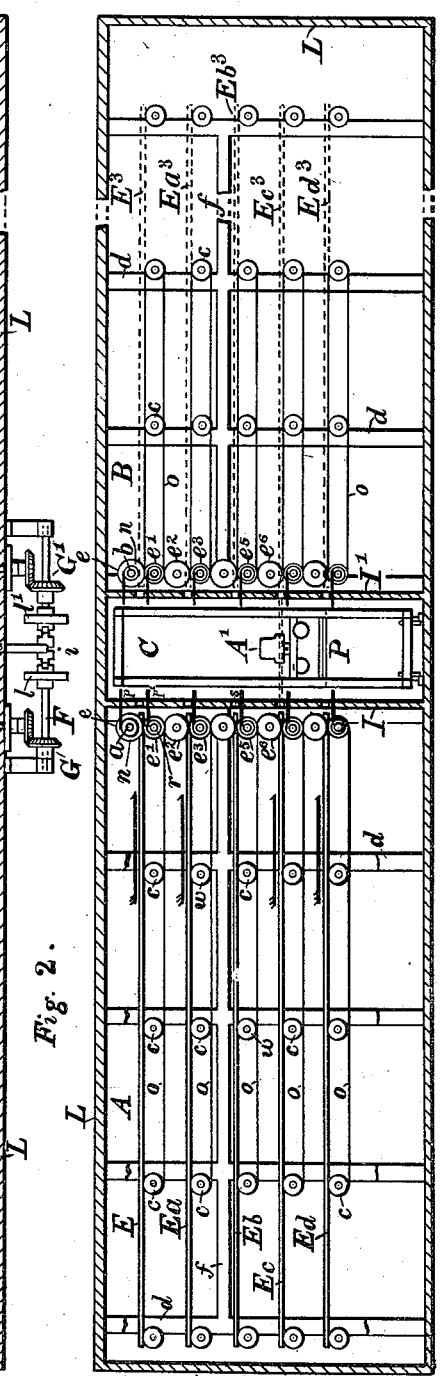
Figure 3:
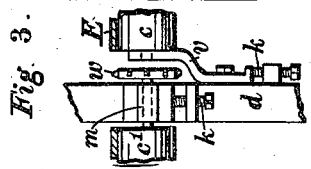

In the accompanying drawings, representing my improved apparatus for manufacturing flexible photographic films, Figure 1 is a plan view. Fig. 2 is a side elevation of the apparatus represented in Fig. 1, the casing next the observer being removed. Fig. 3 is a detail view representing the bracket for the carrying-rolls. Fig. 4 is a side elevation of the carriage. Fig. 5 is an end elevation of the same. Fig. 6 is a side elevation of a portion of the train of gears employed for feeding the sheets. Fig. 7 is a plan view of the upper portion of said train of gears. Fig. 8 is a vertical section of the same. Fig. 9 is a plan view of the carriage. Fig. 10 is a side view of the polishing and preliminary coating device. Fig. 11 is a partial plan view of the same. Fig. 12 is a transverse section of the same. Fig. 13 is a side view of the celluloid-coating device. Fig. 14 is a partial plan view of the same. Fig. 15 is a transverse section of the same. Fig. 16 is a side view of the emulsion-coating device. Fig. 17 is a partial plan view of the same. Fig. 18 is a transverse section of the same. Fig. 19 is a side view of the stripper. Fig. 20 is a partial plan view of the same.

My invention rests on the discovery which I have made that nitrocellulose suitable for the production of transparent flexible films for use for photographic purposes is not reduced or decomposed by aluminium or those alloys of aluminium in which this metal preponderates. In consequence of this property sheets of aluminium may be utilized as a support on which to spread the nitrocellulose while in a semiliquid condition, so as to form after the evaporation of the solvents a transparent flexible film suitable for a support or base for a coating sensitive to light.

My invention is specially designed for the production of transparent flexible films adapted for use for making negatives in the camera; but it will be understood that it can be employed for many other purposes and that the films may be coated with sensitive material other than the gelatino-bromid emulsions now ordinarily employed.

Aluminium can now be obtained rolled in sheets of any required dimensions—say up to forty or fifty inches wide and from fifty to two hundred and fifty feet long—the sheets being stiffened by the rolling operation and thereby adapted to use for making films, which require the maintenance of a true horizontal surface. Although such sheets may be employed while stationary, the hopper or spreading device for the nitrocellulose being arranged to travel along them, I prefer to make the hopper relatively stationary and to move the sheet under it, as thereby I secure a very important economy in the size of the structure required to inclose the apparatus and in the production of a given amount of film within a definite space. The aluminium sheets are continuous from end to end, and consequently the joints at the ends of glass plates, which have heretofore proved seriously objectionable, are avoided. The films made on glass invariably show the joints between the glass plates, whereas my films are of one uniform thickness throughout the whole of their length. The feeding of the sheets from side to side also enables me to introduce the sheets, when coated with nitrocellulose, into a heated chamber, where the drying or evaporation of the solvents is rapidly and perfectly effected, while, on the other hand, on coating the emulsion on the dried film the sheets may be fed into the same or an oppositely-located chilled chamber, whereby I secure an important economy in the time required for the setting or drying of the emulsion. In order to carry these ideas into effect and to render them practically available, my invention in its simplest form, when the aluminium sheet is made to travel, involves the use of a stationary hopper, a chamber on each side of it, and means for feeding the sheet under the hopper from one chamber to the other. These means are also, preferably, constructed so as to be reversed, so as to feed the sheet back again, the hopper having been changed, so as to permit of coating with emulsion. By arranging the feeding devices in series, one above the other, and making the hopper or coating devices adjustable vertically it will be perceived that a considerable number of sheets placed in banks, one above the other, may be operated on and covered with the requisite coatings, thereby effecting a great economy in space. It will also be understood that by making the hopper or coating devices adjustable laterally as well as vertically a series of adjacent banks of sheets can be coated by the same coating mechanism, which is adjusted up and down to suit the different positions of the sheets in the same bank and laterally to adapt itself to the different banks, and that therefore by this arrangement a very large surface for the production of film may be arranged within the minimum cubic volume. The space required by my apparatus is therefore materially reduced.

Any suitable means for shifting the aluminium plates and any suitable coating devices may be employed; but in practice for factories of medium capacity I adopt a construction substantially such as is shown in the accompanying drawings, in which in Fig. 1 I have represented the arrangement of three banks of sheets side by side, with the drying or cooling chambers on opposite sides of a central passage in which the carriage which sustains the coating devices is arranged. It will be obvious that the construction may be extended to any desired number of banks of sheets.

A, Fig. 1, represents one chamber and B another, arranged on opposite sides of a central passage C, in which the carriage D is placed. These chambers or compartments are made of any suitable dimensions adapted to the length or number of the metallic sheets employed or the number of banks of sheets which the apparatus is designed to use. The aluminium sheets E are shifted from one chamber to the other by any suitable mechanical devices, such as being carried on belts or rollers, the rollers being adopted in the construction shown. For the manufacture of sensitive goods the structure will be inclosed within suitable walls or a casing which excludes white light. The devices for feeding the sheets are preferably operated by power, being placed under the control of the operatives who manage the coating mechanism by clutches or other suitable means. The carriage itself can be most suitably shifted vertically or laterally by the operatives. The construction of the carriage is shown in Figs. 4, 5, and 9, from which it will be understood that the coating devices are adjustable vertically on the carriage to suit the height of the different sheets in the same bank and that the carriage can be shifted laterally, so that the coating devices can be brought in line with the sheets of any particular bank E E' E², &c. As indicated in Figs. 1, 4, and 5, the carriage is provided with rollers $t$, which run on the track J, and also with a bolt or suitable locking device $u$, which serves to fasten the carriage in line with any particular bank of sheets.

Confining our attention, in the first place, to the bank of metallic sheets E, it will be understood that they may be shifted in any preferred order from the chamber A to the position E³ in chamber B (see Figs. 1 and 2) and that they must be shifted back again as many times as may be required, the devices used on the carriage for polishing or cleaning the sheets, for applying a suitable material to prevent adherence, for spreading the nitrocellulose, and for coating the dried film with the sensitive substance being changed as the operations proceed. To produce the movement of the sheets, I employ a shaft F, Fig. 1, so connected that it can be revolved in either direction by straight and crossed belts or by any other suitable device, preferably so arranged as to be controlled from within the central passage C. The shaft F is provided with bevel-gears G G', which drive the transverse shafts $a$ and $b$, from which the rollers or other mechanism for moving the sheets are driven.

$h$, Fig. 1, is a lever extending inside the passage C, which may be used to engage a clutch $i$, splined on the shaft F, with either of the pulleys $l\ l'$, which are driven in opposite directions by straight and crossed belts from any suitable driving-shaft. By this or other similar means the shafts $a$ and $b$ may be caused to revolve in either direction, so as to operate the mechanism for shifting the sheets, so as to transfer the sheets from chamber A to chamber B, or vice versa.

In the construction shown a number or series of rollers $c$ is arranged to support and feed the sheets, such rollers being driven by any suitable belt or chain, the construction being such that the rollers under any one of the sheets may be set in operation independently of the others, so that only one sheet is fed forward at a time. The rollers $c$ are sustained within the chambers by any suitable framework, which may consist of uprights $d$, arranged at any suitable distances apart and connected together by horizontal braces $f$, if desired. The shafts or pivots of the rollers revolve in suitable bearings $m$, Fig. 7, attached to the standards $d$ in any suitable way, and preferably so they can be adjusted to level the rollers up, as by the adjusting-screw $k$, Figs. 3 and 8. The shaft $a$ is provided with a clutch $n$, which engages with gear $e$ at one end of a train of gears $e'\ e^2\ e^3\ e^4$, &c., which gears revolve continuously when the clutch $n$ is engaged. The gear $e'$ and every other successive gear in the train—such as $e^3\ e^5$, &c.—are provided with a clutch which connects them with sprocket-wheels which drive the chains o, which operate the rollers in the different series for feeding the different sheets.

$p\ p'\ p^2$, Fig. 6, are levers reaching into the passage C, by means of which the different clutches are operated.

$n'$ is a clutch splined on the shaft of the innermost of the upper series of rollers c and so arranged that when shifted so as to engage with the gear $e'$ the rollers will be driven. The motion is transferred to the other rollers of the upper series by the chain o, connecting the sprocket-wheel r, attached to the clutch $n'$, and similar sprockets $w$, Figs. 1 and 3, on the rest of the rollers. The chain or belt employed permits the shifting of the sprocket-wheel r with the clutch on the shaft far enough to engage or disengage the clutch. The clutch employed is, of course, a square-jawed clutch, which will drive in either direction. Any suitable tightener may be employed on the belt or chain. In a similar manner the next lower series of rollers is operated from the gear $e^3$ by the clutch $n^2$, sprocket $r'$, chain o, and suitable sprockets on the rollers, and so on through the different series. If, therefore, the operator in the central passage C desires to transfer the sheets E from chamber A to B, the shaft a and train of gears being in operation in the proper direction, he uses the lever $p'$, Figs. 2 and 6, to engage the clutch $n'$ and sprocket r with the gear $e'$, and the movement of the rollers c shifts the sheet E from left to right, passes it across the carriage, where it is subjected to the necessary cleaning, polishing, or coating operations, and delivers it in the chamber B at $E^3$. In a similar manner the lever $p^2$ starts the proper set of rollers into operation, so that the sheet Ea, Fig. 2, is transferred to $Ea^3$, and so on successively or in other preferred order throughout the bank of sheets. The intermediate gears $e^2\ e^4$, &c., revolve on studs attached to the upright d. It is preferable to start the rollers c in the chamber which receives the sheets, as B, at the same time that the sheet is started out of the opposite chamber, and this may be accomplished by means of the levers q, Figs. 1 and 2, which control a set of sheet-moving devices similar to that already described as located in chamber A, such set being driven by the shaft b; and the levers p and q, p' and q', &c., as they correspond to the different sets of feed-rollers on the same level in the opposite chambers, may be connected together so as to be operated simultaneously by any suitable mechanism which will allow the lateral shifting of the carriage in the passage C. Such connection may be made by rock-shafts and cranks and connections above or below the path of the carriage, by electricity and suitable magnets, or by pneumatic pressure distributed by pipes to suitable pistons or diaphragms. The skilled constructor will readily secure the simultaneous movements of the levers p and q or the engagement of the clutches n on opposite sides of the central passage C, if desired. It will be observed, however, that the operator, standing on the footboard H of the carriage, as shown, can control these levers with sufficient quickness, the usual rate of feed of the sheets being about twenty feet per minute. The levers p are pivoted on arms attached to the upright d.

The chambers A and B are preferably separated from the central passage C by the walls I I', so that the temperature of the chambers is better preserved, these walls having slots s, Fig. 6, through which the sheets pass, and these slots being provided with suitable doors by which they may be closed, if desired. The doors on the opposite walls may be connected together in any suitable way, so as to be opened or closed at the same time.

The regulation of the temperature of the chamber A is provided for in any suitable manner—such, for instance, as a series of coils of pipes K K', Fig. 1, arranged along the sides or ends of the chamber or between the sheets or otherwise suitably disposed, which coils are connected with a source of heat or steam supply or with any suitable refrigerating apparatus. A similar arrangement of pipes is adopted in the chamber B.

The inclosing walls L of the apparatus may be made of any preferred construction to retain heat or cold and to secure the greatest economy in regulating the temperatures of the chambers.

By reversing the direction of the movement of the shaft F the rollers in the opposite chambers will feed the sheets back from chamber B to chamber A, from position $E^3$ to E, from $Ea^3$ to Ea, &c., the suitable levers and clutches being operated to secure these results and the sheets passing under the mechanism for cleaning, polishing, and coating with nitrocellulose and emulsion and for stripping the coated film located on the carriage in the central passage. This operation of transferring the sheets from one chamber to another and submitting them to the proper operation during their passage through the central chamber may be repeated any requisite number of times. Where two or more banks of sheets are employed, I support the ends of the rollers c of the first bank by arms or brackets v, Figs. 1 and 3, which are attached to the uprights d and are bent outward, so as to avoid the sprockets w on the rollers c' of the second and also of succeeding banks. Any other suitable construction may be adopted in this respect. The metallic sheets should be supported by the rollers at suitable distances apart, dependent on the dimensions and thickness of the sheets; but, as indicated in the drawings, only a portion of the rollers are driven, sufficient to drive the sheets. Any suitable provision may be made for automatically throwing off the feed-motion when one of the sheets has fully entered into one of the chambers. Thus at the outer end of the chamber B a rock-shaft or other suitable device may be arranged by suitable connections to operate the lever q and disconnect its clutch, or the same result may be secured by electricity or pneumatic pressure. When, however, the end of a sheet passes the carriage, the operator will understand that he should work the lever q, and the walls at the ends of the chambers will arrest the sheets even if they be not immediately stopped.

The construction of the carriage D, which adjustably supports the devices for operating on and coating the surfaces of the sheets passing across it, will be understood from Figs. 4, 5, and 9. As already mentioned, the carriage is arranged to be shifted laterally in the central passage C on the track J, where two or more banks of sheets are employed, being provided with the rollers t and the locking device u. The carriage supports the necessary cleaning, coating, and stripping devices, which are adjustable vertically to adapt the devices to the different sheets in any of the banks. The carriage may be of any suitable construction adapted to performing the required functions. In the construction shown the carriage consists of the sills or base N, supporting the uprights O, on which the platform or cage P is arranged to be adjusted up and down to adapt the apparatus to the different heights of the sheets in any one bank. The cage carries the rollers Q Q, over which the sheets pass in traveling from the chamber A to the chamber B, or vice versa. The lowest position of the cage is represented by the full lines in Figs. 4 and 5, and the highest position, in which it registers with the uppermost sheet E in any of the banks, is indicated by the dotted lines.

Any suitable mechanism may be adopted for adjusting the platform vertically on the carriage; but the arrangement shown, by which an operative while standing on the projecting footboard H is enabled to raise or lower himself along with the platform, is preferred, as it keeps the coating devices, &c., under the convenient control of the operative in all positions of adjustment. For this purpose I provide the shafts x, having the hand-wheels M, arranged within convenient reach of a person on the footboard H, and I employ the worm-gears and worms y and z to revolve the shafts R, by which the ropes or chains S are wound up or unwound to raise and lower the cage or platform. The shafts R are provided with the drums T, about which the rope S is wound, passing up around the pulleys U U at the top of the carriage from the drum on one shaft to the other, and since the drums are attached to their respective shafts the operative at one side of the carriage on one of the footboards can raise or lower the carriage, and himself with it. Any other suitable arrangement or construction of the carriage may, however, be adopted. The upright O may be provided with any suitable guides for the platform, such as the ribs W, Figs. 4 and 9. The platform or cage consists of any suitable framework arranged to support the various shafts and other parts.

The devices for operating on the sheet while it is passing from one chamber to the other are represented in Figs. 10 to 20, inclusive.

V, Figs. 10, 11, and 12, is a rotary cleaning or polishing brush supported on the carriage D and driven by any suitable power—by a belt or by the electric motor X, which may be either connected to the brush-shaft by gears or a belt or directly, as shown. The brush may be of any suitable construction, such as a series of disks of cloth or other suitable material secured together between collars on the shaft. The brush may run in either direction.

Y is a roller which may be used to apply to the surface of the sheet E passing under it a thin coating of any suitable material adapted to prevent the film from adhering to the plate—such, for instance, as paraffin dissolved in benzin. The roller Y receives its supply of such material from the trough a' by the rollers b' c², which are supported in any suitable manner. These rollers may be driven by the sheet itself or in any other suitable way. The paraffin or other substance may be applied to the sheet either before or after the polishing, or it may be supplied to the brush itself by any suitable means. The polishing device is provided with a base Z, by which it is attached to the platform or cage, such base also serving to support the sheet E during its movement, or a suitable supporting-roller—such as is indicated at Q', Fig. 15—may be employed. The base is attached to the platform in any suitable manner—such, for instance, as bolts passing through the perforated lugs d', Fig. 11.

After a series of sheets or, if preferred, the sheets in two or more banks have been subjected to suitable cleaning operations while being fed from one chamber to the other they are next coated with the nitrocellulose by a suitable coating device, such as is represented in Figs. 13, 14, and 15. This device is placed on the carriage after the sheets have been cleaned and prepared and is used to spread the nitrocellulose in a semiliquid condition on the sheets as they are transferred from one chamber to the other.

A' is the hopper, f' the scraper or straight-edged instrument which spreads the celluloid evenly on the sheet, and g a valve or gate which regulates the amount of material allowed to flow down from the hopper.

In Fig. 15 the coating apparatus is represented in the proper position when the sheet is fed in the direction indicated by the arrow; but it will be understood that all of the cleaning, coating, or other devices employed are reversible on the carriage, so as to adapt themselves to the sheets when fed from either direction. The scraper f' is made adjustable vertically, so as to vary the thickness of the coating of nitrocellulose applied to the sheet which is supported by the base Z or the roller Q'. In order to hold the sheet firmly down on the base or roller, I employ on the inside of the ends of the hopper a flange h', which projects inward over the edges of the sheet which pass between it and the base or roller. These flanges are used on both edges of the sheet, and they may be made adjustable on the ends of the hopper by slotted lugs j, Fig. 15, or other suitable devices. Similar flanges may be employed in connection with the emulsion-coating apparatus shown in Figs. 16, 17, and 18 and the polishing or cleaning devices already mentioned. The gate g is made adjustable to vary the flow of the celluloid in any suitable manner—such, for instance, as by the inclined slots and screws k', Fig. 14, and the lever m'. Blocks s', Fig. 14, in the ends of the hopper serve to prevent the flow of the celluloid at these points.

After the metallic sheets in any bank or number of banks have been shifted from one chamber to the other, having had a thin uniform layer of celluloid applied upon their upper surfaces by the coating device, steam is preferably turned onto the pipes or coils K in the chamber into which said coated sheets have been fed to hasten the evaporation of the solvents employed, and suitable fans or other means of rapidly renewing the air in such chamber may be also employed. As soon as the nitrocellulose film is freed from the solvents it is ready for the next operation in the production of photographic films, which consists in coating the film with a suitable compound sensitive to light, such as any ordinary or preferred gelatino-bromid emulsion. Apparatus for effecting such coating is represented in Figs. 16, 17, and 18, although any other suitable apparatus may be employed. The emulsion-coating device shown consists of a suitable hopper H', provided with a regulating-valve u', Fig. 18, and a trail-strip t', which rests on the sheet E as it traverses under the hopper. The rate of feed of the emulsion, which must of course be proportioned to the movement of the sheets, is regulated by the arm v', attached to the valve u' and provided, if desired, with the adjusting-screw w', bearing on the lug x' on the outside of one of the ends of the hopper. To cut off the flow of emulsion entirely the arm v' is swung to the position indicated by the dotted lines in Fig. 16, when the valve u' is turned so as to entirely cut off the flow of the emulsion. The hopper H' consists of suitable side walls connected at their lower ends by a part which receives the valve u' and is provided with suitable ports or openings for the feeding of the emulsion. The passage for the emulsion is represented as fully open in Fig. 18. The trail-strip t' extends across the whole surface of the sheet which has been coated with the film and is supported by the arms y', attached to the sides or ends of the hopper, so that its position may be reversed, as indicated by the dotted lines in Fig. 18, to adapt the device to the traverse of the sheets in either direction. The emulsion flows through the valve u' onto the trail-strip and is by it deposited in a uniform and regular layer on the nitrocellulose film on the sheet. The trail-strip is preferably made of flexible rubber; but any other suitable material, such as thin wood, may be employed. The arms y' are provided with pins, on which the strip is hung, so that it may be readily reversed to suit the different directions in which the sheet is fed.

After the celluloid-coated sheets have received the proper coating of emulsion and have been transferred to one of the chambers in any preferred order such chamber is preferably chilled to set and harden the emulsion by connecting the pipes or coils K, which may have any suitable location in the chamber, between the metallic sheets, if preferred, with any suitable refrigerating apparatus, and, if desired, the ventilation of the chamber containing the emulsion-coated film may be effected by any suitable suction or pressure fans. The air entering the chamber should be thoroughly strained. It is unnecessary to remark that during the coating with emulsion and the subsequent drying all white light must be absolutely excluded, the only light permissible in the central passage or chamber being red or non-actinic. If the different banks of sheets be separated from each other by partitions and the cooling-pipes are arranged for such purpose, any one bank of coated films may be cooled and dried without waiting for the next; or even in an apparatus constructed for a number of banks a single sheet may be coated, cooled, and dried by the proper arrangements.

After the application of the sensitive emulsion to the films all subsequent operations must be conducted in non-actinic light, and the first of these operations is the stripping of the sensitized film from the sheets. For this purpose the sheets are fed backward, and an apparatus such as is represented in Figs. 19 and 20 is employed to strip the film from the metallic sheet as it traverses the central passage. Such stripping mechanism, which may be operated by hand or by power, consists of a suitable frame and a stripping-roller, which may be substituted for the cleaning or coating devices hereinbefore described. In the accompanying drawings I have shown the stripping-roller as operated by a hand-crank U'. T' is the stripping-roller, on which the sensitized nitrocellulose film is wound after the emulsion has set and dried and as the sheet is fed back from the chamber which has received it after the emulsion was applied. The operation is very simple. The front end of the sensitized film is attached to the roller T', and this roller is turned by hand or power, so as to strip the sensitized film from the sheet and to put it in condition for the subsequent operations of slitting and coiling into forms for commercial delivery. In the arrangement shown the stripping-roller is provided with a hand-crank U', by which it is operated so as to detach the film from the sheet; but it will be obvious to the skilled constructor that any other suitable stripping apparatus may be employed.

It will be understood that the mechanism for shifting the sheets may be variously modified without departure from the essential features of my invention. Thus the sheets may be supported so as to slide directly on a table or series of bars without employing the rollers, and the sheets may be operated by direct connection with a traveling belt or chain, which is provided with a suitable grip adapted to engage the front edge or side of the sheet or a lug arranged to push it forward from the rear. In some forms of these sheet-feeding mechanisms the belt or chain can be allowed to run continuously, the gripping or driving device being arranged to be applied to the sheet by the operator. It will also be understood that with some forms of the sheet-feeding mechanism the feeding devices may be located in one of the chambers only, suitable provision being made for reversing the motion. The arrangement may be such also that the sheet is operated by mechanism located in the receiving-chamber, being then drawn along in contact with the cleaning, coating, or other devices. The mechanism for reversing and stopping and starting the sheet-feeding devices may also be constructed in various different ways.

Suitable fans are employed for removing or renewing the air in the chamber or for promoting the drying of the film.

The polishing and coating devices may be made adjustable on the cage or platform P by means of adjusting-screws or other suitable devices, as indicated at z', Fig. 5.

I am aware that it has been proposed to make transparent film by coating celluloid on German silver and on nickel-plated copper; but these materials are not applicable to the purpose, because they decompose the nitrocellulose, discolor the film, and destroy its transparency, while the products of the decomposition reduce the silver in the sensitive coating and decrease its sensitiveness. Aluminium is not corroded by the nitrocellulose; and if it were the products do not reduce the silver or injure the sensitiveness. The aluminium sheets also are capable of receiving a high polish adapted to produce a smooth surface on the film, and the dried film, even when coated with emulsion, strips very freely from the sheets, whereas films coated on German silver or nickel-plated copper adhere to the surface in consequence of the chemical action which has taken place. The well-known marks or streaks which occur in the emulsion after development in films coated on glass, in consequence of electric discharges during the stripping operation, are entirely avoided. The films coated on aluminium are very transparent and entirely colorless.

I claim—

1. The combination, in an apparatus for making flexible films of nitrocellulose, of a relatively-movable plate of rolled aluminium and a suitable device for spreading fluid nitrocellulose on the plate, whereby uniformity in the thickness of the films throughout their length is secured, substantially as described.

2. The combination in an apparatus for making flexible films of nitrocellulose, of a traveling plate of rolled aluminium, and a suitable device for spreading the fluid nitrocellulose on the plate during its movement, substantially as described.

3. The combination in an apparatus for making flexible films of nitrocellulose, of a traveling plate of rolled aluminium, a suitable stationary device for spreading the fluid nitrocellulose on the plate, and a heated drying-chamber into which the coated plate is delivered, substantially as described.

4. In an apparatus for making nitrocellulose films, the combination of two chambers arranged to form a central passage between them, suitable sheet-feeding devices placed one above the other in the chambers and adapted to feed metallic sheets in succession from one chamber to the other across the passage and a suitable vertically-adjustable coating device in the passage, whereby the sheets are successively coated during their journey from one chamber to the other, substantially as described.

5. In an apparatus for making nitrocellulose films, the combination of two chambers arranged to form a central passage between them, suitable sheet-feeding devices placed one above the other in the chambers, corresponding series of clutches or disconnecting devices, and a suitable vertically-adjustable coating device in the passage, substantially as described.

6. In an apparatus for making nitrocellulose films, the combination of two chambers arranged to form a central passage between them, four or more series of suitable sheet-feeding devices arranged one above the other in parallel banks in each chamber, and adapted to feed metallic sheets in succession from one chamber to the other across the passage, and a suitable vertically-adjustable and laterally-movable coating device in the passage, substantially as described.

7. In an apparatus for making nitrocellulose films, the combination of two chambers arranged to form a central passage between them, two or more series of suitable sheet-feeding devices arranged one above the other in parallel banks in each chamber, and adapted to feed metallic sheets in succession from one chamber to the other across the passage, corresponding series of clutches or disconnecting devices, and a suitable vertically-adjustable and laterally-movable coating device in the passage, substantially as described.

8. In an apparatus for making nitrocellulose films, the combination of two chambers arranged to form a central passage between them, suitable sheet-feeding devices placed one above the other in the chambers and adapted to feed metallic sheets in succession from one chamber to the other across the passage, a suitable vertically-adjustable coating device in the passage above the sheets, and suitable vertically-adjustable means for supporting the sheets while moving across the passage, substantially as described.

9. The combination with the chambers A and B, arranged to form the central passage C between them, of the carriage D, a suitable vertically-adjustable coating device supported thereby, and suitable sheet-feeding mechanism, substantially as described.

10. The combination with the chambers A and B arranged to form the central passage C between them, of the carriage D, a suitable vertically-adjustable coating device carried thereby, suitable sheet-feeding mechanism, and the circulation-pipes K for varying the temperature of either of the chambers, substantially as described.

11. The combination with the chambers A and B, arranged to form the central passage C between them, of the laterally-movable carriage D, a suitable vertically-adjustable coating device supported thereby, and suitable sheet-feeding mechanism, substantially as described.

12. The combination of the chambers A and B, arranged to form the central passage C between them, of the laterally-movable carriage D, a vertically-adjustable coating device supported thereby, suitable sheet-feeding mechanism, and means for reversing the movement of the feeding mechanism, substantially as described.

13. The combination with the chambers A and B, arranged to form the central passage C between them, of the slotted partitions I I', the laterally-movable carriage D, a suitable vertically-adjustable coating device supported thereby, suitable sheet-feeding mechanism, and means for varying the temperature of the chambers, or either of them, substantially as described.

14. The combination with the chambers A and B, arranged to form the central passage C between them, of a suitable coating device located in the passage, the rollers $c$, shafts $a$, $b$ and F, and suitable reversing mechanism, substantially as described.

15. The combination with the chambers A and B, arranged to form the central passage C between them, of the carriage D, having uprights O, the vertically-adjustable platform, a suitable coating device supported thereon, means for raising and lowering the platform, and suitable sheet-feeding mechanism, substantially as described.

16. The combination with the chambers A and B, arranged to form the central passage C between them, of the carriage D having uprights O, the vertically-adjustable platform, a suitable coating device supported thereon, means for sustaining the sheet while passing across the carriage, suitable sheet-feeding mechanism, and means for raising and lowering the platform, substantially as described.

17. The combination with the chambers A and B, arranged to form the central passage C between them, of the carriage D, a suitable coating device supported thereon, the rollers $c$, shaft $a$, clutch $n$, and flexible driving connection $o$, substantially as described.

HENRY M. REICHENBACH.

Witnesses:
  GEO. B. SELDEN,
  G. S. DEY.